US012341397B2

(12) United States Patent
Gagnon

(10) Patent No.: US 12,341,397 B2
(45) Date of Patent: Jun. 24, 2025

(54) LINEAR ACTUATOR SYSTEM FOR MOTION SIMULATOR

(71) Applicant: D-BOX TECHNOLOGIES INC., Longueuil (CA)

(72) Inventor: Stephan Gagnon, Laval (CA)

(73) Assignee: D-BOX TECHNOLOGIES INC., Longueuil (CA)

( * ) Notice: Subject to any disclaimer, the term of this patent is extended or adjusted under 35 U.S.C. 154(b) by 214 days.

(21) Appl. No.: 18/001,752

(22) PCT Filed: Jun. 15, 2021

(86) PCT No.: PCT/CA2021/050814
§ 371 (c)(1),
(2) Date: Dec. 14, 2022

(87) PCT Pub. No.: WO2021/253117
PCT Pub. Date: Dec. 23, 2021

(65) Prior Publication Data
US 2023/0231458 A1 Jul. 20, 2023

Related U.S. Application Data

(60) Provisional application No. 63/165,319, filed on Mar. 24, 2021, provisional application No. 63/039,078, filed on Jun. 15, 2020.

(51) Int. Cl.

| | |
|---|---|
| ***H02K 7/00*** | (2006.01) |
| ***H02K 41/02*** | (2006.01) |
| *A47C 15/00* | (2006.01) |

(52) U.S. Cl.
CPC .......... *H02K 41/02* (2013.01); *H02K 7/003* (2013.01); *A47C 15/004* (2013.01)

(58) Field of Classification Search
CPC .......... H02K 7/00; H02K 7/003; H02K 41/00; H02K 41/02; A63G 31/02; A63G 31/16; A63J 5/00; A63J 25/00; G09B 9/00; G09B 9/02; G09B 9/04; G09B 9/08; G09B 9/12; G09B 9/14; F16M 11/12; F16M 11/121; F16M 11/18; F16M 11/20; F16M 11/203; F16M 11/2035; F16M 11/202; F16M 11/2028; F16H 55/17; F16H 25/20;
(Continued)

(56) References Cited

U.S. PATENT DOCUMENTS 9,829,149 B2 11/2017 Jennings

FOREIGN PATENT DOCUMENTS

CN 102162520 A * 8/2011
JP H0667599 A 3/1994
(Continued)

*Primary Examiner* — Tran N Nguyen
(74) *Attorney, Agent, or Firm* — NORTON ROSE FULBRIGHT CANADA LLP

(57) ABSTRACT

A linear actuator system may have an actuator assembly for moving an output in translation in a first direction. A transmission has a frame, a joining link(s) pivotally connected to the frame at a first location and operatively connected to the actuator assembly at a second location for receiving movement from the output. The joining link(s) contacting an interface at a third location to cause relative movement between the frame and the interface in a second direction differing from the first direction. A motion platform system is also provided.

20 Claims, 12 Drawing Sheets

(58) Field of Classification Search
CPC . F16H 25/22; F16H 25/24; F16H 7/02; F16H 7/08
See application file for complete search history.

(56) References Cited

FOREIGN PATENT DOCUMENTS

| | | | |
|---|---|---|---|
| KR | 101955688 | B1 | 3/2019 |
| KR | 102039158 | B1 | 10/2019 |
| WO | 2020091134 | A1 | 5/2020 |

* cited by examiner

LINEAR ACTUATOR SYSTEM FOR MOTION SIMULATOR

CROSS-REFERENCE TO RELATED APPLICATION

The present application claims the benefit of U.S. Patent Application No. 63/039,078 filed on Jun. 15, 2020, and of U.S. Patent Application No. 63/165,319 filed on Mar. 24, 2021, the contents of both of which are incorporated herein by reference.

FIELD OF THE APPLICATION

The present application relates to linear actuators as used with motion simulators or in motion simulation, for instance to displace an occupant or occupants of a platform in synchrony with a sequence of video images or with an audio track, whether at home or in a theater, to watch movies, television, to play video games.

BACKGROUND OF THE ART

In the entertainment industry and in the gaming industry, there is an increasing demand for enhancing the viewing experience of a viewer or gamer. Accordingly, there has been numerous innovations to improve the image and the sound of viewings. Motion simulation has also been developed to produce movements of a motion platform (e.g., a seat, a chair) in synchrony with sequences of images of a viewing. For instance, U.S. Pat. Nos. 6,585,515 and 7,934,773 are two examples of systems that have been created to impart motion to a seat, to enhance a viewing experience.

Electro-mechanical linear actuators are commonly used in such motion platforms. These linear actuators must often be capable of producing low and medium amplitude outputs, at low or medium frequency, for a high number of strokes. Moreover, these linear actuators must support a portion of the weight of a platform and its occupant(s).

Linear actuators are typically elongated components that are positioned in a vertical orientation. This therefore imposes a constraint of height to motion platforms that use such vertically oriented actuators. It would be desirable to change an orientation of the linear actuators while not impacting substantially their performance.

SUMMARY OF THE APPLICATION

It is therefore an aim of the present disclosure to provide a linear actuator that addresses issues associated with the prior art.

It is a further aim of the present disclosure to provide a motion platform system that addresses issues associated with the prior art.

Therefore, in accordance with a first aspect of the present application, there is provided a linear actuator system comprising: an actuator assembly for moving an output in translation in a first direction; and a transmission having a frame, at least one joining link pivotally connected to the frame at a first location and operatively connected to the actuator assembly at a second location for receiving movement from the output, the at least one joining link contacting an interface at a third location to cause relative movement between the frame and the interface in a second direction differing from the first direction.

Further in accordance with the first aspect, for example, the first direction and the second direction are generally transverse to one another.

Still further in accordance with the first aspect, for example, the at least one joining link has the first location, the second location and the third location in a L pattern.

Still further in accordance with the first aspect, for example, the at least one joining link has a triangular shape.

Still further in accordance with the first aspect, for example, a pair of the at least one joining link share a first rotational axis at the first location and share a second rotational axis at the second location.

Still further in accordance with the first aspect, for example, the pair share a third rotational axis at the third location.

Still further in accordance with the first aspect, for example, the at least one joining link is pivotally connected to the output of the actuator assembly at the second location.

Still further in accordance with the first aspect, for example, the at least one joining link is pivotally connected to at least one link at the third location, the at least one link being pivotally connected to the interface.

Still further in accordance with the first aspect, for example, the interface is pivotally connected to the frame.

Still further in accordance with the first aspect, for example, the interface has a pair of arms projecting from a central member, the pair of arms being pivotally connected to the frame, the central member pivotally connected to the at least one link.

Still further in accordance with the first aspect, for example, the at least one joining link is pivotally connected to at least a first link at the second location, the first link being pivotally connected to the output of the actuator assembly.

Still further in accordance with the first aspect, for example, the at least one joining link is pivotally connected to at least one second link at the third location, the second link being pivotally connected to the interface.

Still further in accordance with the first aspect, for example, the interface is pivotally connected to the frame, and the actuator assembly is secured to the frame.

Still further in accordance with the first aspect, for example, the interface has a pair of arms projecting from a central member, the pair of arms being pivotally connected to the frame, the central member pivotally connected to the second link.

Still further in accordance with the first aspect, for example, the frame defines a receptacle to receive at least a portion of the actuator assembly.

Still further in accordance with the first aspect, for example, actuator assembly is a linear actuator.

Still further in accordance with the first aspect, for example, the linear actuator is a bi-directional electromechanical linear actuator.

In accordance with a second aspect of the present disclosure, there is provided a motion platform system comprising: a support structure; a motion structure operatively mounted to the support structure by at least one joint so as to be displaceable relative to the support structure in at least one degree of freedom; and at least one of the linear actuator system as described above, the linear actuator system being between the support structure and the motion structure, the linear actuator system actuatable to impart movement to the motion structure in the at least one degree of freedom.

Further in accordance with the second aspect, for example, the motion structure includes a first panel configured to define a motion platform.

Still further in accordance with the second aspect, for example, the first panel has receptacles configured for receiving casters of a chair.

Still further in accordance with the second aspect, for example, the receptacles are elongated troughs.

Still further in accordance with the second aspect, for example, there are five of the elongated troughs, the elongated troughs being circumferentially distributed 72 degrees apart.

Still further in accordance with the second aspect, for example, there may be provided a strap for each receptacle.

Still further in accordance with the second aspect, for example, the first panel has a pentagonal shape.

Still further in accordance with the second aspect, for example, a second panel may be located under the first panel, the linear actuator system being fixed to the second panel.

Still further in accordance with the second aspect, for example, the at least one joint is connected to the second panel.

Still further in accordance with the second aspect, for example, the second panel has a pentagonal shape.

Still further in accordance with the second aspect, for example, the support structure is a third panel being located under the second panel.

Still further in accordance with the second aspect, for example, the third panel has a pentagonal shape.

Still further in accordance with the second aspect, for example, the support structure is the ground.

Still further in accordance with the second aspect, for example, a spherical joint may be between the linear actuator system and the support structure.

Still further in accordance with the second aspect, for example, the at least one joint has a pivot.

Still further in accordance with the second aspect, for example, the at least one joint includes two pivot members spaced apart and sharing a common rotational axis.

Still further in accordance with the second aspect, for example, a height between the support structure and a support plane of the motion structure is at most 12 inches high.

DESCRIPTION OF THE PREFERRED EMBODIMENTS

Figure 1:
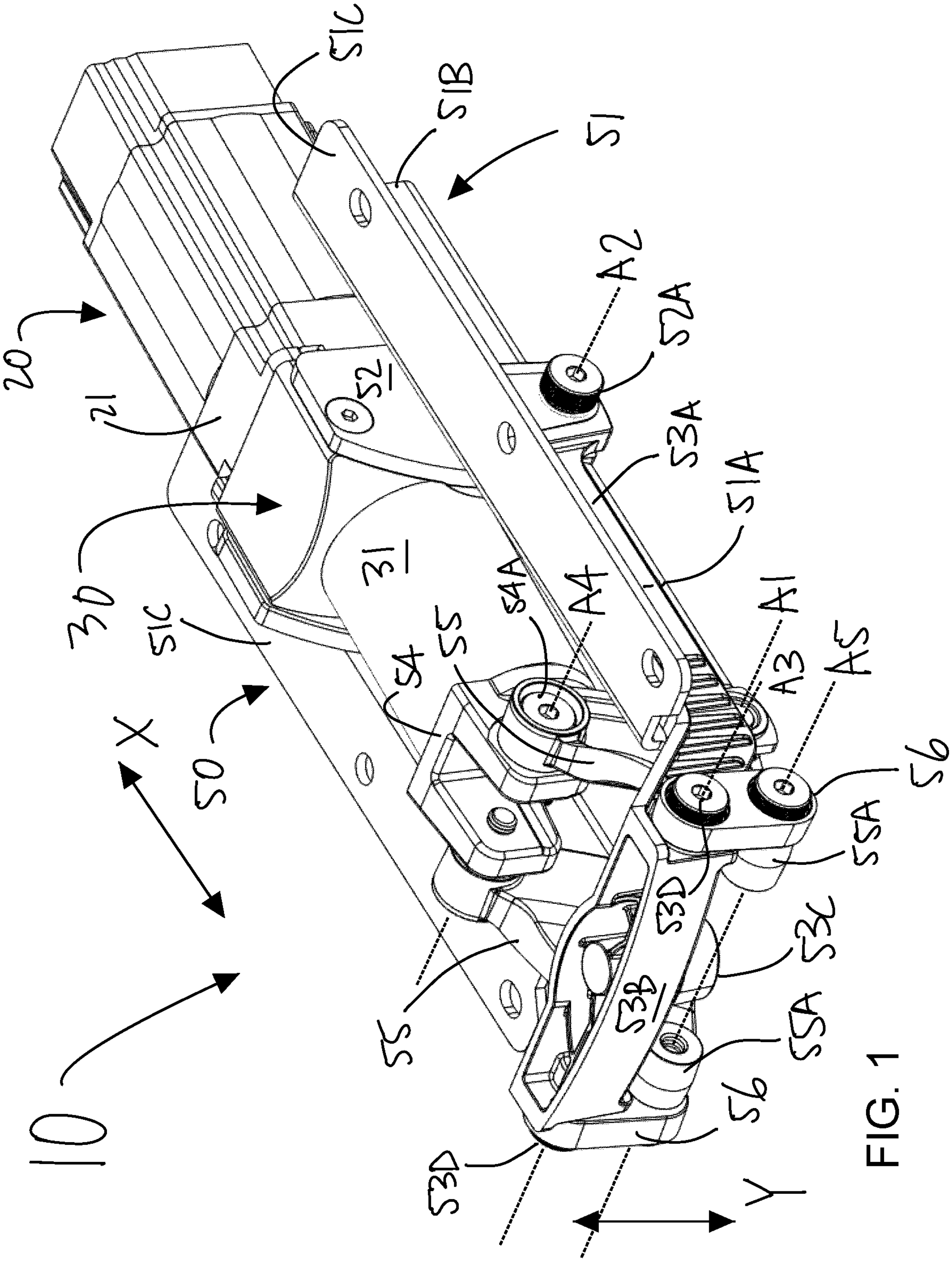
FIG. 1 is a perspective view of a linear actuator system for motion simulators in accordance with the present disclosure.
Figure 2:
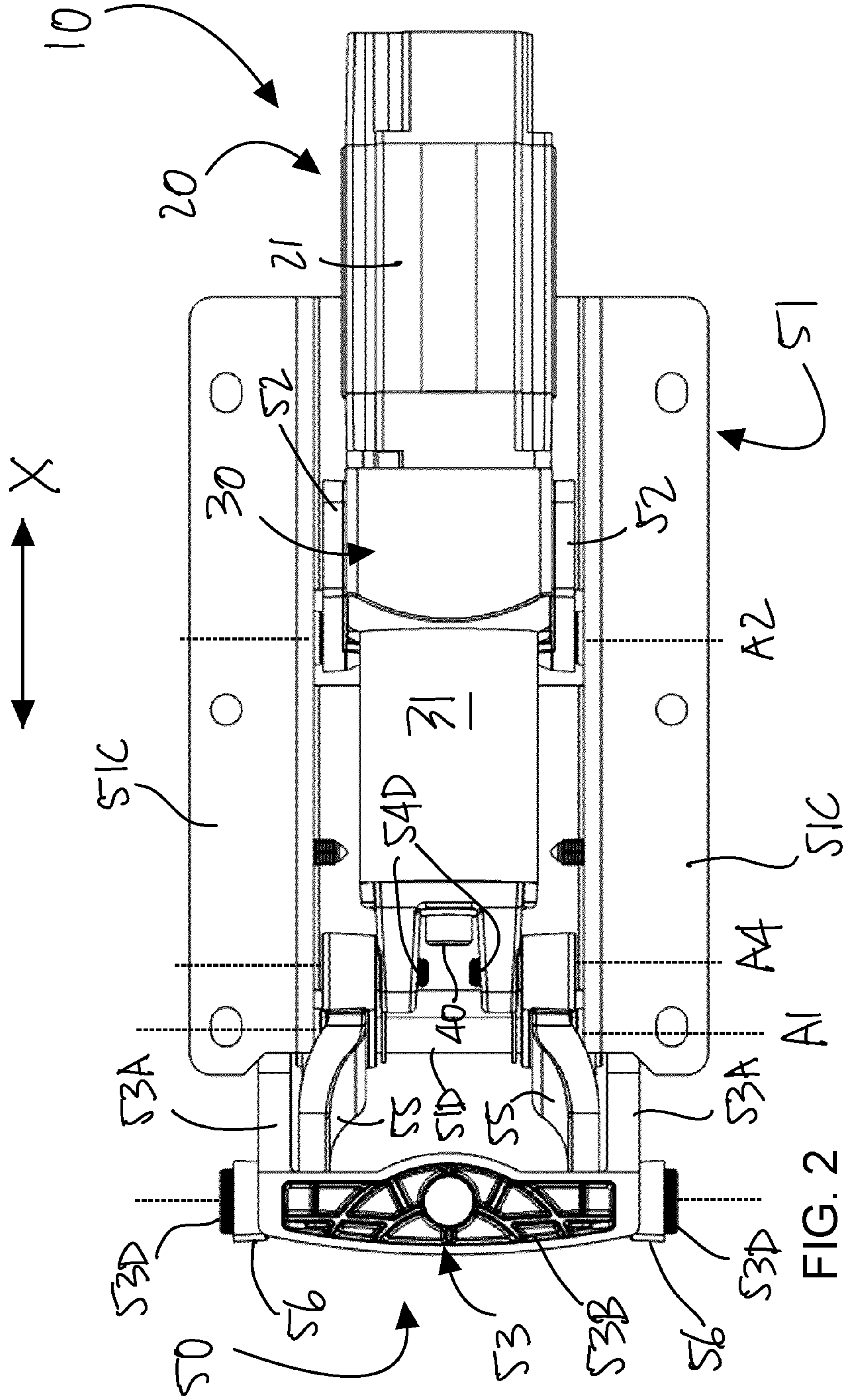
FIG. 2 is a top view of the linear actuator system of FIG. 1.
Figure 3:
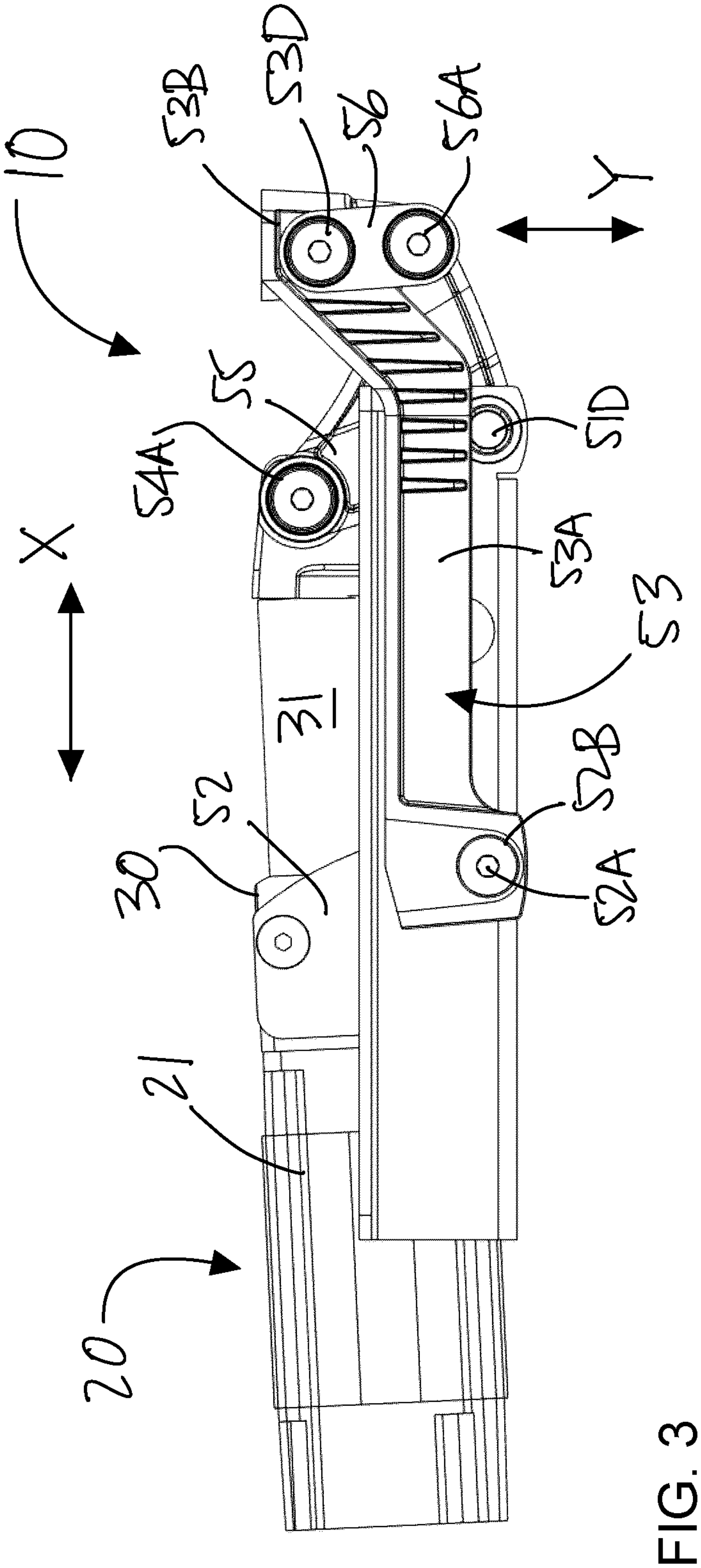
FIG. 3 is an elevation view of the linear actuator system of FIG. 1.

Referring to the drawings and more particularly to FIGS. 1 to 3, there is illustrated at 10 a linear actuator system of the type used for motion simulators. The linear actuator system 10 is well suited to be used between the ground or a baseplate and a motion platform (i.e., support surface, chair, seat, flight simulator/compartment, etc) to displace the motion platform in synchrony with a sequence of images and/or sound, for instance part of a motion picture, a televised event, a video, a video game, a simulation, haptic event, a virtual reality session, etc. The linear actuator system 10 of the illustrated embodiments is an electro-mechanical linear actuator that is driven by a motion controller, or any other appropriate and adapted source of motion signals (e.g., media player, D-cinema projector, internet, etc), e.g., code representing specific motions to be performed. The motion signal is sent to the linear actuator system 10 in a suitable format to drive a motor thereof. In an embodiment, one or more of the actuator system 10 are used concurrently to support and displace a seat relative to the ground (ground including a structure on the ground). The linear actuator system 10 therefore produces a translational output, along an axial direction thereof, illustrated as X, but the output is converted into a movement along Y. In an embodiment, direction X is generally horizontal in use, while direction Y is generally vertical. However, this is an option.

The linear actuator system 10 may be an assembly of four groups (i.e., portions, assemblies, sub-assemblies, etc), namely a motor group 20, a structural group 30, a driven group 40, and a transmission group 50. The expression "group" is used merely to simplify the following description. The motor group 20, the structural group 30 and the driven group 40 are only schematically illustrated and briefly detailed, as the details of the present disclosure mostly pertain to the transmission group 50. For reference, PCT application no. PCT/US2013/072605 describes one example of a motor group 20, of a structural group 30, and of a driven group 40 and is hence incorporated by reference. Components shown as being part of a group may be part of another group, may be shared by groups, etc.

The motor group 20 may receive motion signals in electric format, and may produce rotational motions corresponding to the motion signals received, as a possibility among others. In such an embodiment, the motor group 20 is therefore connected to a source of motion signals or like electronic equipment. The motor group 20 is operatively connected to the driven group 40 to transmit its rotational motions thereto. The motor group 20 may have an electric motor 21. The electric motor 21 may be a bi-directional motor of the type receiving an electrical motion signal, to convert the signal in a rotational output proportional to the motion signal, in either circular directions, in direct drive. By way of example, the electric motor 21 is a brushless DC motor. This type of electric motor is provided as an example, and any other appropriate type of motor may be used. In alternative embodiments, instead of an electric motor, a pneumatic motor, an hydraulic motor, or cylinders are used to produce a reciprocating translational movement.

The structural group 30 may house at least part of the driven group 40, and operatively connects the motor group 20 to the driven group 40. Moreover, the structural group 30 may be the interface between the linear actuator system 10 and the motion platform, the ground, or a supporting structure. The structural group 30 may include a casing 31, also known as a cover, housing, or the like. In the illustrated embodiment, the casing 31 is a monolithic piece. The casing 31 is a main structural component of the linear actuator system 10, as it interfaces the motor group 20 to the driven group 40, and may also interface the linear actuator system 10 to the transmission group 50.

The driven group 40 converts the rotational motions from the motor group 20 into linear motions along direction X. The driven group 40 is displaceable relative to the structural group 30, and is shown emerging out of the casing 31 in FIG. 1.

Figure 4:
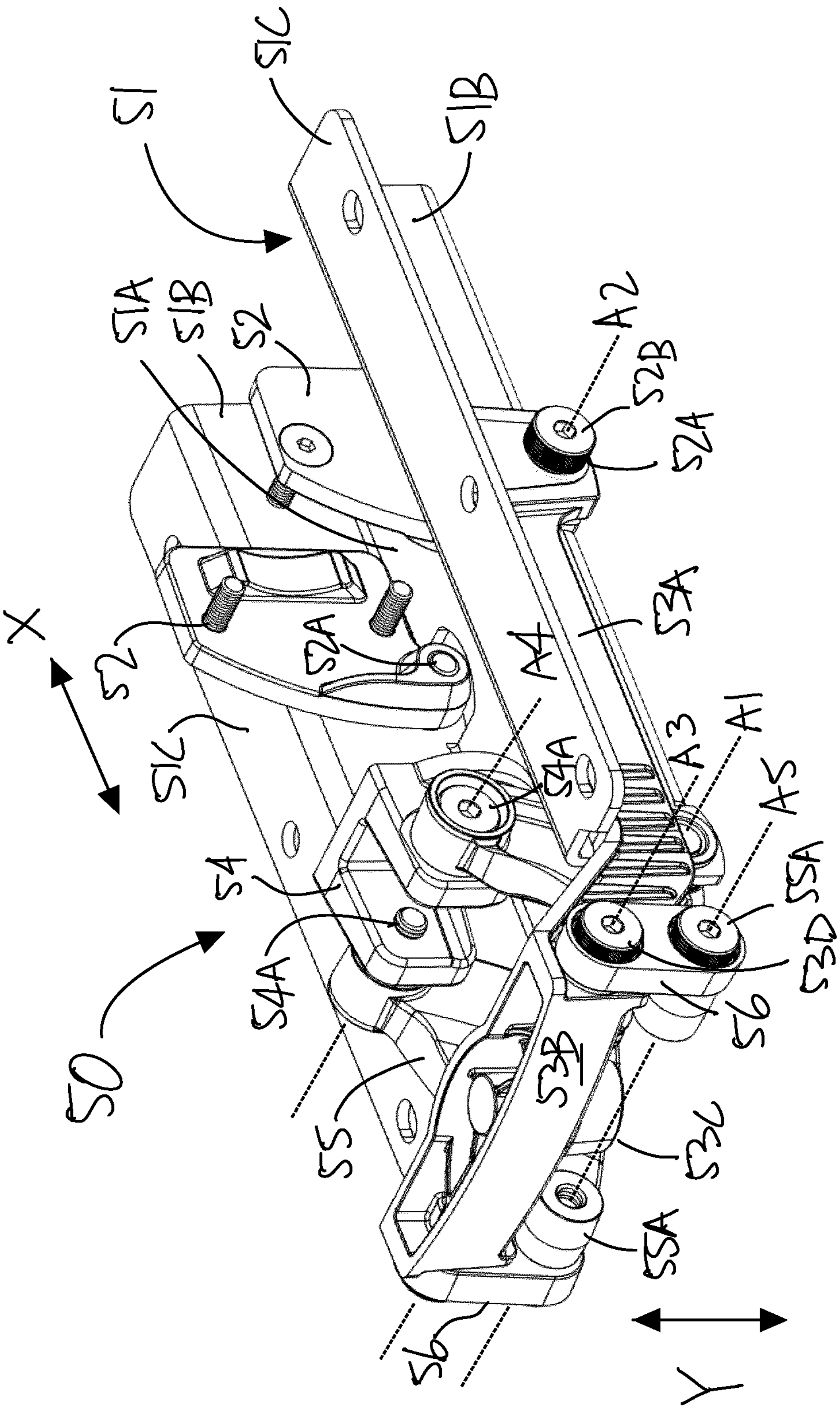
FIG. 4 is an isometric view of a transmission group of the linear actuator system of FIG. 1.
Figure 5:
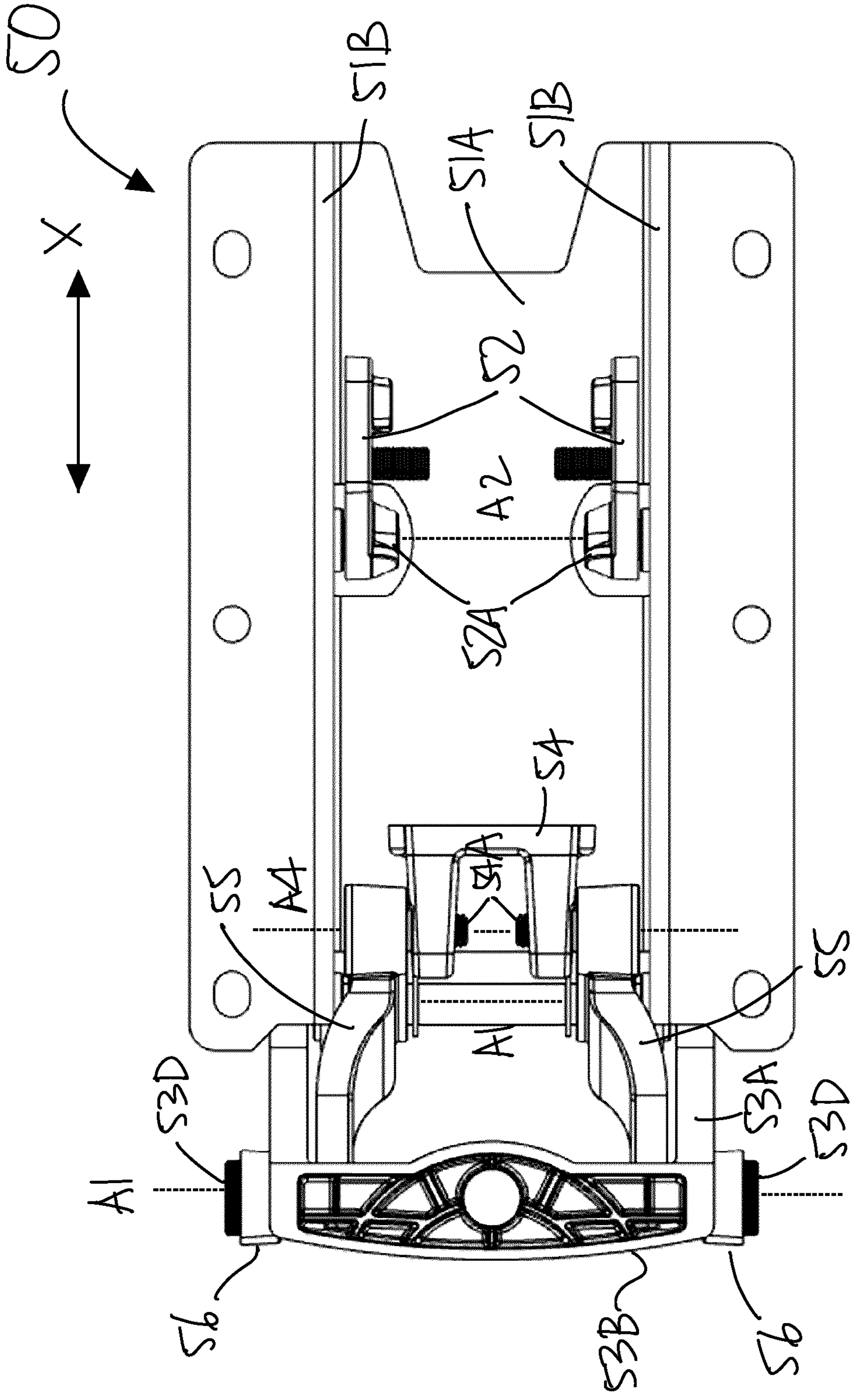
FIG. 5 is a top view of the transmission group of the linear actuator system of FIG. 1.
Figure 6A:
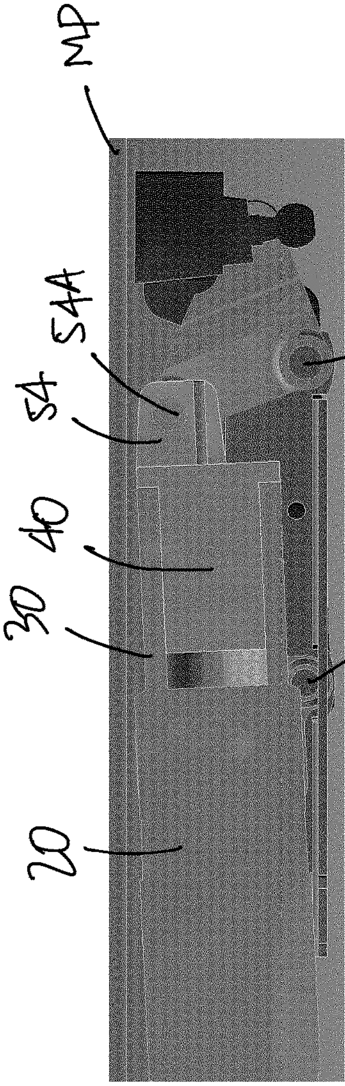
FIGS. 6A to 6C are a sequence showing a conversion of movement from horizontal to vertical as permitted by the linear actuator system of FIG. 1.
Figure 6B:
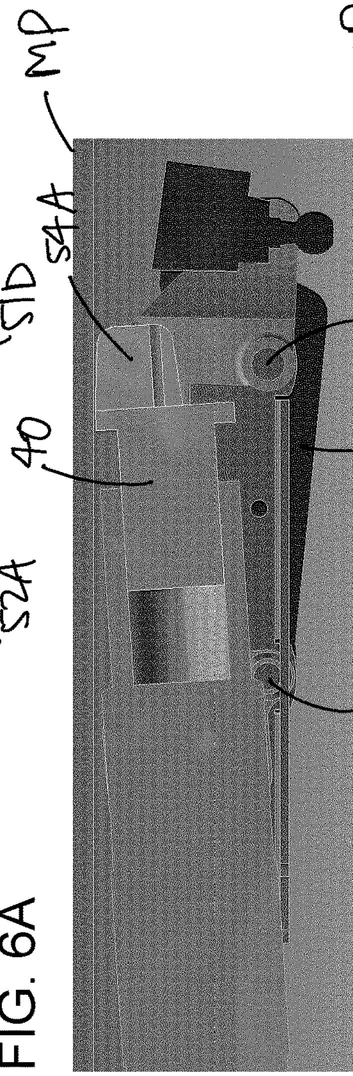
Figure 6C:
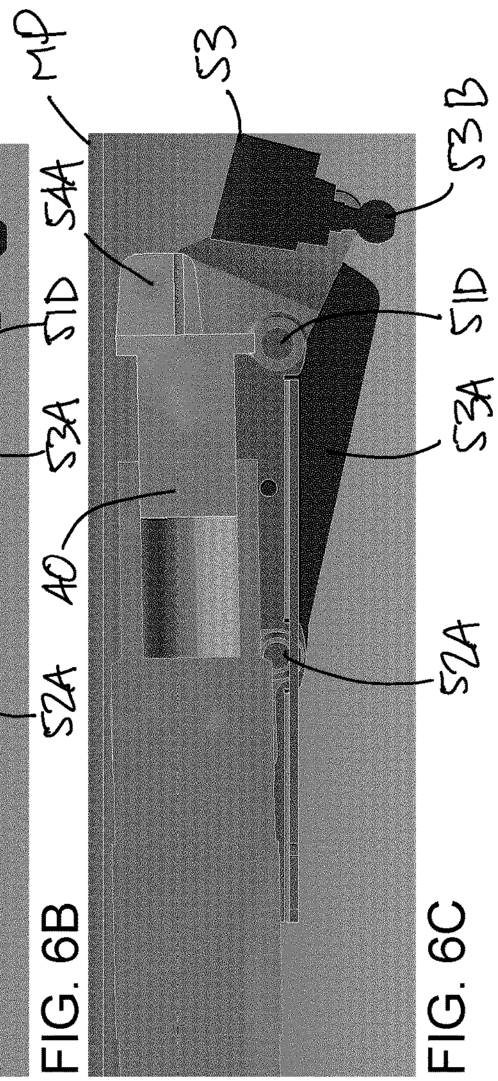
Figure 7:
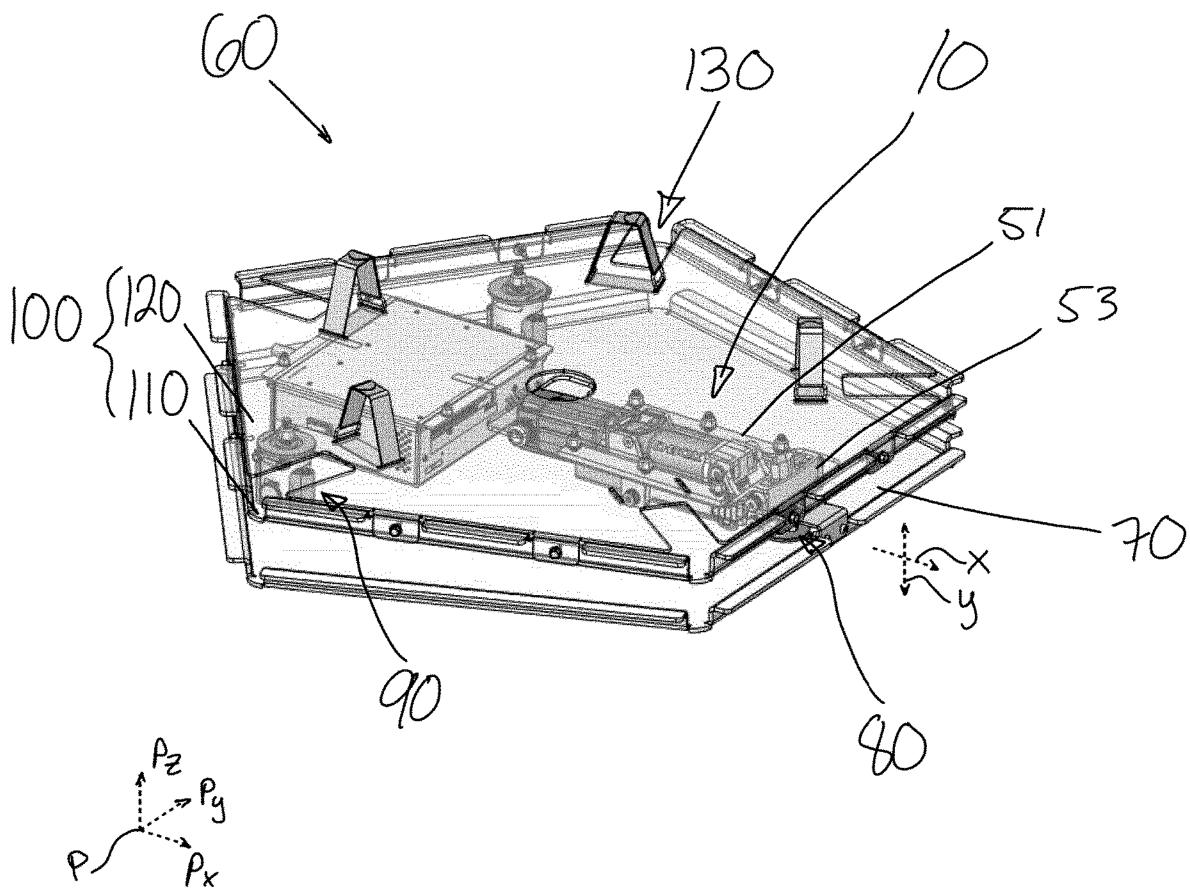
FIG. 7 is a perspective view of an embodiment of a motion platform system for motion simulators in accordance with an embodiment of the present disclosure, with outer portions of a motion platform thereof being see-through to show underlying portions of the motion platform system including the actuator of FIG. 1.

Still referring to FIGS. 1 to 3, a transmission group 50 is shown relative to a remainder of the linear actuator system 10, i.e. relative to the motor group 20, the structural group 30 and the driven group 40, all of which are referred to as actuator assembly herein. In FIGS. 4 and 5, the motor group 20, the structural group 30 and the driven group 40 are removed for clarity and to better illustrate the transmission group 50 alone. The transmission group 50, also known as a transmission assembly, transmission, etc, is tasked with changing a direction of the output from the actuator assembly, for example from direction X to direction y, or any other desired direction depending on the application. As a whole, the linear actuator system 10 pushes and pulls, but may also rely on gravity to assist in lowering the motion platform MP (FIGS. 6A to 6C).

The transmission group 50 has a support frame 51 (a.k.a., bracket, base, etc). The support frame 51 is used to interface the linear actuator system 10 to a motion platform. The motion platform may be a seat, a flat platform, a flat base, a plate, or any other suitable end effector, an example of which is given below. The support frame 51 may have a generally elongated shape having a plate 51A. A pair of side walls 51B project from the plate 51A so as to define a receptacle with the plate 51A, in which other components of the linear actuator system 10 will be received, including the actuator assembly as a whole as a possibility. Flanges 51C may be provided at a top edge of the side walls 51B so as to secure the support frame 51 to a motion platform. As observed, holes may be defined in the flanges 51C so as to use standard fasteners as one possible way to secure the support frame 51 to a motion platform. For example, as shown in FIGS. 6A-6C, the support frame 51 may be connected to an underside of the motion platform MP. In an embodiment, the whole actuator assembly is located entirely below the plane shown by MP, which plane may be coplanar with the underside of the motion platform MP. In another embodiment, the linear actuator system 10 is inverted with the flanges 51C against the floor or structure, with the linear actuator system 10 moving the motion platform MP in the Y direction, such as generally upward.

In an embodiment, the support frame 51 is made from a monolithic metal plate that may be bent, cast, etc to have the receptacle shape described above. Other constructions (U brackets, saddles, box, etc) are possible as are other materials. The support frame 51 must have the structural integrity to support the actuator assembly and sustain the motions involved.

A pivot 51D may be provided at an end of the support frame 51 and defines rotational axis A1. The pivot 51A may be a single shaft as illustrated, or a pair of pins, a receptacle, or any other pivot component that will form a rotational joint with another member.

Still referring to FIGS. 1 to 3, the casing of the motor group 20 is accommodated in the receptacle of the support frame 51. However, it may be allowed to pivot as it transmits movement. Therefore, in an embodiment, the casing of the motor group 20 is supported by a pair of side plates 52 (a.k.a., links, swing members, etc) on opposite sides of the motor group 20, as shown in FIGS. 4 and 5. The side plates 52 may have pivots 52A by which they are connected to the support frame 51. The pivots 52A may be a single shaft, a pair of shaft portions as illustrated, or a pair of pins, receptacles, or any other pivot component that will form a rotational joint with another member. The pivots 52A are in line with one another and define rotational axis A2. Fasteners 52B may be provided on the side plates 52 in order to attach the casing 21 of the motor group 20—or any other part of the actuator assembly—to the side plates 52. The fasteners may for example be bolts, set screws, etc. Other fastening configurations are considered, including welding, etc. In an embodiment, the side plates 52 may be integrally formed into the casing 21 as one possibility.

Referring to FIGS. 4 and 5, a movement interface 53 is operatingly connected to the support frame 51 and may interface the transmission group 50 to a floor or to a motion platform. The movement interface 53 may have a pair of arms 53A that are connected to the support frame 51 by way of the pivots 52A, though independently of the movement of the side plates 52. Therefore, both the motor group 20 and the movement interface 53 rotate about axis A2. However, it is also possible to have the axis of rotation of the movement interface 53 being offset from axis A2. For example, axis A2 for the motor group 20 may be farther away that the axis of rotation of the movement interface 53 relative to axis A1, to increase the magnitude of movement of the movement interface 53, for example. The free ends of the arms 53A may be joined by a central member 53B. In an embodiment, the arms 53A are elongated and form a monolithic piece with the central member 53B, although this is not necessary. The movement interface 53 may consequently have a U shape, or swing shape. The arms 53A may pivot, but as they are essentially elongated components, the movement of the central member 53B is quasi-translational, i.e., along direction Y, and thus generally vertical. A joint member 53C may be provided in the central member 53B in order to connect a floor pad, a base, a caster, etc. to the movement interface 53. As shown in FIGS. 6A to 6C, the joint member 53C may be in the form of a sphere (or complementary spherical receptacle) so as to form a spherical joint with a base that could be located on the floor or against the motion platform MP. This is one possible configuration among others. The free ends of the arms 53A further define pivots 53D that have a pivot axis A3.

A piston bracket 54, or equivalent connector component, is located at an end of the piston of the driven group 40. Therefore, the piston bracket 54 may translate upon actuation from the motor group 20, in that the piston bracket 54 may be connected to a shaft or a piston of driven group 40. Therefore, the piston bracket 54 moves in translation but may also rotate slightly due to the rotational mount of the motor group 20 to the support frame 51 via the pivot axis A2 of the side plates 52. A direction of the translation, along X, is essentially transverse to the various axes A1, A2 and A3 described above. The piston bracket 54 may be in the form of a U-shaped bracket (e.g., a clevis portion) having a pair of pivots 54A, defining an axis of rotation A4. The pivot 51A may be a single shaft, a pair of pins, a receptacle, or any other pivot component that will form a rotational joint with another member.

Cams 55 are responsible for converting the movement of the piston bracket 54 in direction X to a vertical movement in direction Y of the central member 53B of the movement interface 53. The expression "cam" is used as the joining link rotates and results in a generally translational movement in direction Y (though the movement may be more accurately described as being an arc of a circle). Although a pair of cams 55 is shown, a single cam could also be used. The cams 55 are pivotally mounted to the support frame 51 by the pivot 51D. Therefore, the cams 55 rotate about axis A1. Moreover, the cams 55 are pivotally connected to piston bracket 54 at pivots 54A, whereby the cams 55 rotate about axis A4 relative to the piston bracket 54. As a consequence of the cams 55 being pivotally connected to the support frame 51 at axis A1, and to the pivots 54A of the piston bracket 54, pivots 55A at a free end of the cams 55 therefore move generally along the Y direction as a function of being pushed or pulled by the piston bracket 54. The pivots 55A define pivot axis A5. The pivots 55A may be a single shaft, a pair of pins, a receptacle, or any other pivot component that will form a rotational joint with another member. Moreover, although the pivots 55A are shown as offering only a rotation degree of freedom, it is contemplated to add a translational degree of freedom at the interface between the cams 55 and the links 56. This may be achieved by having the pivots 55A received in guide slots in the links 56, as a possibility.

In the cams 55, the axes A1, A4 and A5 are in a triangular parallel arrangement, to cause this Y-direction movement. The pivots 55A could be locked elsewhere on the cams 55 to impart a different direction of movement to the pivots 55A.

Links 56 interconnect the pivots 55A of the cams 55 to the pivots 53D of the movement interface 53 in direction Y. The links 56 may be required due to the fact that the pivots 55A of the cams 55 have some remaining translation component in direction X with the push and pull action from the actuator assembly.

FIGS. 6A, 6B and 6C show different moments of the displacement of the central member 53B of the movement interface 53 as a result of the translational output from the actuator assembly of the linear actuator system 10. With the actuator assembly being generally horizontal, it is seen that the output of the central member 53B is essentially vertical. Moreover, the triangular arrangement of the axes A1, A4 and A5 may be equilateral in an embodiment, or near equilateral. This may cause the stroke of movement of the piston bracket 54 to have a value equal or close to a distance of movement of the central member 53B. Other arrangements are possible, to amplify or reduce movements from the actuator assembly. In an embodiment, axes A1-A5 are all parallel to one another to reduce the risk of mechanical jamming.

The embodiment of the transmission group 50 shown in the figures may have a twin set up, in that many of its components may be duplicated and/or may have a symmetry plane. In an embodiment the symmetry plane incorporates directions X and Y. The twin set up allows the forces on components to be spread, and may make the transmission group 50 more robust than without such a twin set up.

Referring to FIGS. 12A to 12E. various arrangements of the linear actuator system 10 are shown, using the axes A1-A5 as reference, and with like reference numerals indicating a correspondence between the variant of FIGS. 1 to 6, and the ones of FIGS. 12A to 12E.

Figure 12A:
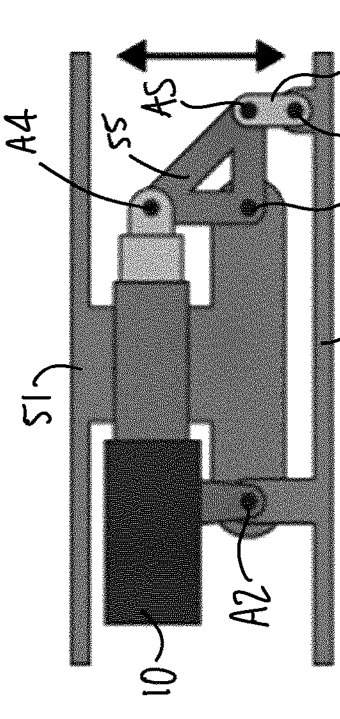
FIGS. 12A to 12E are schematic side views of contemplated configurations of the linear actuator system of the present disclosure.

In FIG. 12A, the link 56 is connected to the movement interface 53 in such a way that axis A3 is lower than the axis A5. The linear actuator system 10, in the same manner as in FIGS. 1 to 6, is not solidary to either one of the end points, i.e., the support frame 51 and the movement interface 53. The arrangement of FIGS. 1 to 6 and of FIG. 12A has six solidary parts: the structure of the linear actuator system 10, the driven group 40, the support frame 51, the movement interface 53, the cam 55 and the link 56. The arrangement may feature six degrees of freedom of rotation, including the two on the axis A2, i.e., between the linear actuator system 10 and the support frame 51, and between the support frame 51 and the movement interface 53.

Figure 12B:
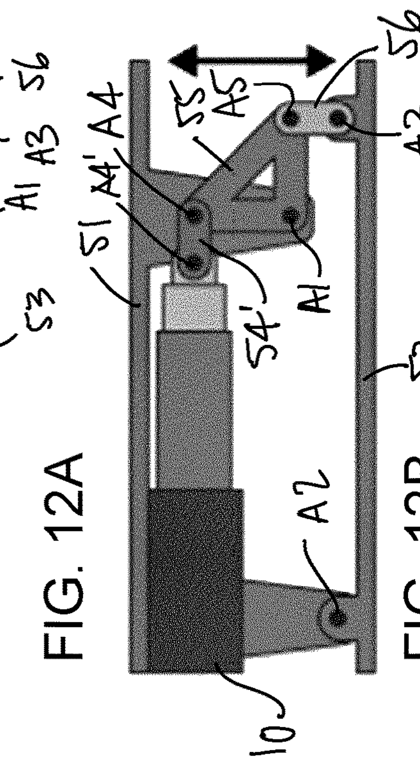

In FIG. 12B, the structural portion of the linear actuator system 10 is fixed to the support frame 51. Accordingly, piston bracket 54' has two distinct pivot axes, A4 and A4'. The arrangement of FIG. 12B has six solidary parts: the structure of the linear actuator system 10 and support frame 51, the driven group 40, the movement interface 53, the piston bracket 54', the cam 55 and the link 56. The arrangement may feature six degrees of freedom of rotation, at axes A1, A2, A3, A4, A4' and A5.

Figure 12C:
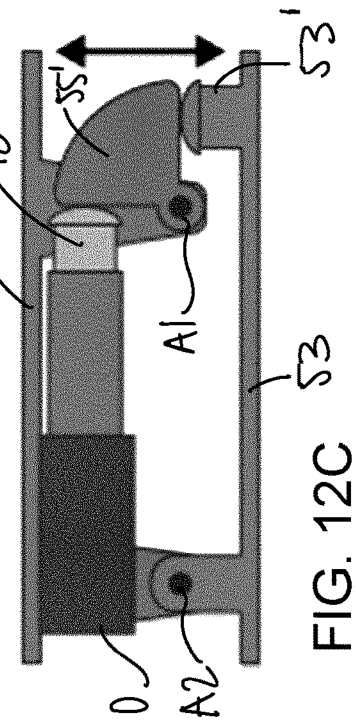

In FIG. 12C, the structural portion of the linear actuator system 10 is also fixed to the support frame 51. Cam 55' is not rigidly connected to the piston of the driven group 40 or to the movement interface 53, relying instead on sliding abutments to transmit movement from the linear actuator to the movement interface 53. The abutment ends of the piston of the driven group 40 and/or to the movement interface 53 may have rounded contact surfaces to ease the transmission of movement. Other configurations are contemplated, including using low friction materials. Gravity may hold the components assembled and in contact. The arrangement of FIG. 12C has four solidary parts: the structure of the linear actuator system 10 and support frame 51, the driven group 40, the movement interface 53, and the cam 55'. The arrangement may feature two rotational joints, at axes A1 and A2, with two friction planes that are uncaptured. Captured sliding arrangements are also considered, such as a pin and slot mechanism to maintain contact between cam 55' and at least one of driven group 40 and interface 53', as a possibility among others (roller in groove, etc).

Figure 12D:
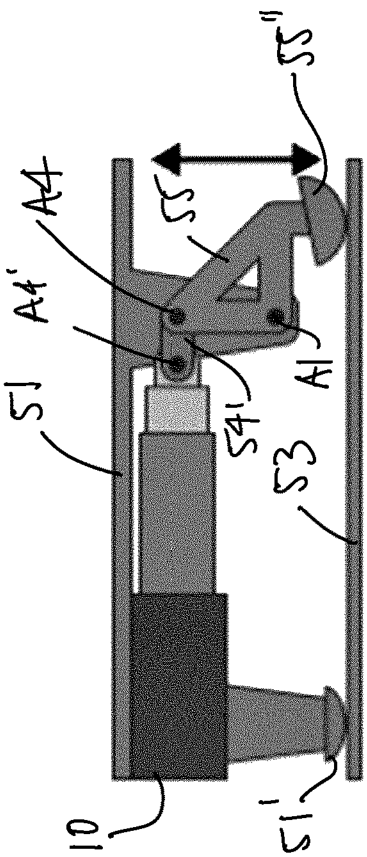

In FIG. 12D, the structural portion of the linear actuator system 10 is also fixed to the support frame 51. The piston bracket 54' has two distinct pivot axes, A4 and A4'. Cam 55 has a sliding component 55" to transmit movement from the linear actuator system 10 toward the movement interface 53. The linear actuator system 10' may be slidingly disposed on the movement interface 53, via abutment 51'. Consequently, the movement interface 53 is not driven to move by the linear actuator system 10. Though referred to as movement interface, item 53 may essentially be the ground, or a support surface. The sliding component 55" may be a cylindrical component (e.g., semi-cylindrical), a spherical or hemispherical component, or a roller(s) (wheel(s), caster(s)) as in FIG. 12E. Gravity may hold the components assembled and in contact. Accordingly, piston bracket 54' has two distinct pivot axes, A4 and A4'. The arrangement of FIG. 12D has four solidary parts: the structure of the linear actuator system 10 and support frame 51, the driven group 40, the piston bracket 54', and the cam 55'. The arrangement may feature three rotational joints, at axes A1, A4 and A4', with one uncaptured friction plane, with high friction for the assembly to remain in position.

The arrangement of FIG. 12D has four solidary parts: the structure of the linear actuator system 10 and support frame 51, the driven group 40, the piston bracket 54', and the cam 55. The arrangement may feature three rotational joints, at axes A1, A4 and A4', with one uncaptured friction plane, with high friction for the assembly to remain in position.

Figure 12E:
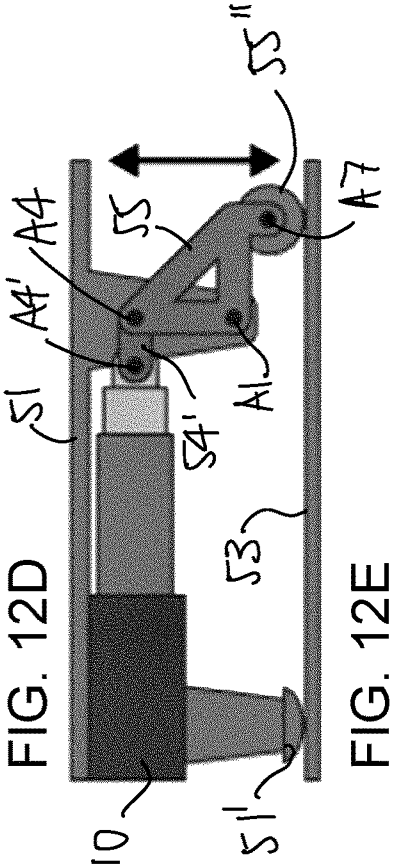

The arrangement of FIG. 12E has four solidary parts: the structure of the linear actuator system 10 and support frame 51, the driven group 40, the piston bracket 54', the cam 55, and the roller 55'. The arrangement may feature three rotational joints, at axes A1, A4, A4', and A7 at the wheel 55'.

Based on FIGS. 1 to 6 and 12A-12E, the linear actuator system 10 may be generally described as having an actuator assembly for moving an output in translation in a first direction A transmission has a frame. A joining link(s) is pivotally connected to the frame at a first location (e.g., axis A1) and operatively connected to the actuator assembly at a second location (e.g., axis A4, axis A4') for receiving movement from the output. The joining link(s) contacts an interface at a third location (e.g., axis A3, axis A5) to cause relative movement between the frame (e.g., 51) and the interface (e.g., 53) in a second direction, such as Y, differing from the first direction, such as X.

With reference to FIGS. 7-11, a motion platform system according to another aspect of the present technology and generally shown at 60 will now be described. Although one may use the motion platform system 60 by simply standing thereon, the motion platform system 60 is well suited to be paired with seating of a conventional type such as a chair, an office chair, or a more specialized type such as a gaming chair or a pilot seat found in a simulator. One such seat may, as it will be appreciated from the forthcoming description, be rendered an end effector for transmitting an output of the motion platform system 60 to a user of the seat. Indeed, the motion platform system 60 may impart the seat with movements in synchrony with one or more signals that may include video, sound and/or a signal indicative of an input device being used, for example a controller connected to a simulator or gaming system. Such movements may be devised to impart the seat with vibro-kinetic effects of an amplitude suitable for simulating movement and haptic events, as the case may be. The motion platform system 60 therefore produces a motion output that imparts a variation in position and/or orientation of the seat that may be defined, at least in part, relative to one or more of directions Px, Py, Pz of a reference coordinate system P. In the depicted embodiments, the motion output includes a component along the direction Pz, in this case not purely translational (though it could be), but rather coupled to rotational movement about a rotation axis R parallel to the direction Py. In embodiments, the motion output may include any combination of translational component(s) and rotational component(s) to impart the seat with desired motion via the motion platform system 60. The movements may be for example described as pitch and roll. The number of degrees of freedom (DOF) of movement may vary depending on the nature of the motion platform system 60. For example, the motion platform system 60 of FIG. 6 with a single one of the linear actuator system 10 may output a single DOF of movement.

The motion platform system 60 includes a support structure 70, a number of joints 80 (FIG. 8A), 90 (FIG. 8B) and an actuator connected to the support structure 70, as well as a motion structure 100 kinematically coupled to the support structure 70 via the joints 80, 90 and the actuator so as to govern the motion output of the motion structure 100 of the motion platform system 60. The actuator is arranged to output a vertical movement, i.e., such that its output occurs at least to some degree along the direction Pz. As in the embodiment depicted in FIGS. 7-10, the actuator may correspond to the actuator system 10 described hereinabove, here shown laid over the support structure 70 such that its directions X and Y generally correspond to the directions Px and PZ, respectively. The actuator system 10 may be arranged such that its movement interface 53 connects to the support structure 70 via a first joint 80 from the joints 80, 90 (referred henceforth as the first joint 80). The actuator system 10 could also be laid on the ground or on the support structure 70, for instance for arrangements such as in FIGS. 12D and 12E. Because of the arrangement described below, the motion platform assembly system 60 may be of low profile, such as at most 12 inches in height from the support structure to a support plane, or top plane, of the motion structure 100. The first joint 80 may be a ball joint. The first joint 80 may be constrained relative to the support structure 70, whether fixedly, translatably or rotatably so. Although the first joint 80 is described as a piece provided in addition to the actuator system 10, the first joint 80 may in some implementations form an end piece of the movement interface 53. Other types of joints may be between the movement interface 53 and the support structure 70, such as a universal joint. In some implementations, the first joint 80 may include more than one component, for example components each provided with one or more DOFs, such as a slider connected to the support structure 70 and a pivot connected between the slider and the actuator system 10, or components provided with a sole, common DOF, such as pivots disposed in a hinge-like arrangement. A rigid connection is also contemplated, for instance with additional DOFs being provided at other joints to enable the movement between the support structure 70 and the motion structure 100.

Second joints 90 from the joints 80, 90, link the motion structure 100 to the support structure 70 (e.g., a panel) at a location spaced away from the first joint 80 in a plane incorporating Px and Py. Although it could consist of a single panel, the motion structure 100 has a pair of opposite sides 110, 120, or portions, or plates, or panels (first panel, second panel), of which a first, support-facing side, or actuation portion 110, interfaces the actuator system 10, for example via the support frame 51. The sides 110 and 120 are shown as panels of metal sheeting, but other panels could be used, such as a molded honeycomb structure. A second side or output portion 120 of the motion structure 100, also referred to as a support platform, bears docking features 130. As will be described hereinafter, the docking features 130 include at least a concavity to receive a wheel in an embodiment. The docking features 130 may include one structural feature of the motion structure 100 defining a non-permanent yet secure attachment means that is suitable for operatingly connecting the motion platform system 60 to any one of a wide range of seats, or for supporting a user standing on it. A sleeve 140 (FIG. 11), bellows-like member or other membrane-like component may be attached to peripheral edges of the support and motion structures 70, 100 to follow relative movements thereof, shielding internal components of the motion platform system 60. Components such as footrests, speakers, input devices and other implements may be provided on the motion structure 100.

Figure 8:
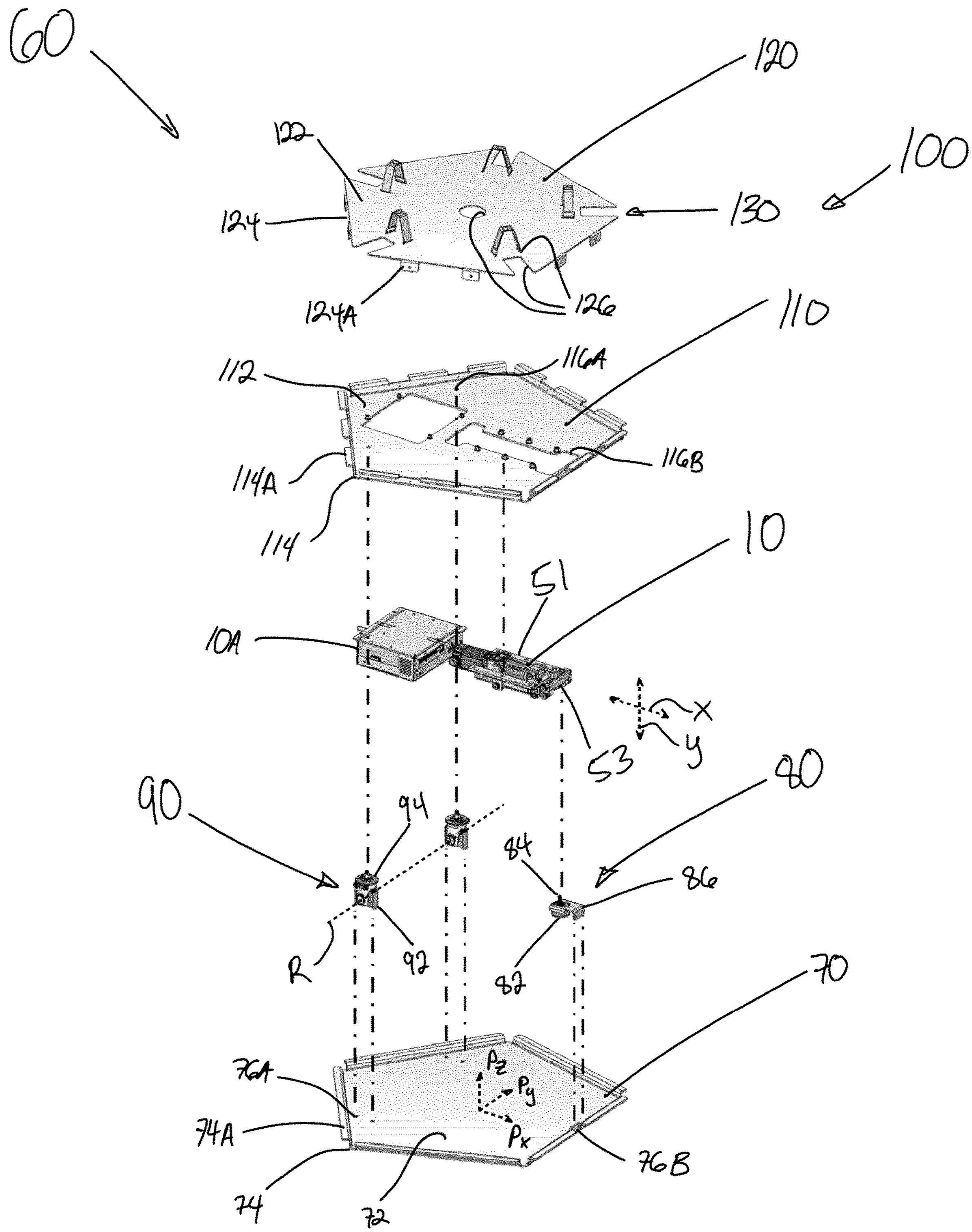
FIG. 8 is an exploded view of the motion platform system of FIG. 7.

In view of FIG. 8, it will be appreciated that the support structure 70 is a ground-interfacing component of the motion platform system 60 provided as a spatial reference relative to which other components of the motion platform system 60 may be positioned. The support structure 70 may optionally be suitably arranged for levelling, protecting and/or spatially arranging other components relative to one another. Alternatively, the motion platform system 60 may be without the support structure 70, and lay instead on the ground or on a surface of a structure. In the depicted implementation, the support structure 70 is constructed of sheet metal having been cut and shaped into a plate-like structure having a flat bottom 72 surrounded with a peripheral wall 74. The support structure 70 may support, or otherwise hold in position, either the joints 80, 90 and/or the actuator system 10. Tabs 74A, holes 76A, groove 76B in one of the tabs 74A or other like features may be present on the support structure 70 to this end. The sheet metal structure shown is one possibility among others. As an alternative or as an addition, it is contemplated to use a framing structure as another possibility, with the framing structure being made of elongated beams interrelating the various components as set out above.

The actuator system 10, the first joint 80, and the second joints 90 may be described as a motion-governing group of the motion platform system 60. Each one of the joints 80, 90 is independently fixedly attached relative to the support structure 70, although this is merely one possible implementation among those contemplated. A single joint 90 could be used if a single actuator system 10 is present.

Figure 8A:
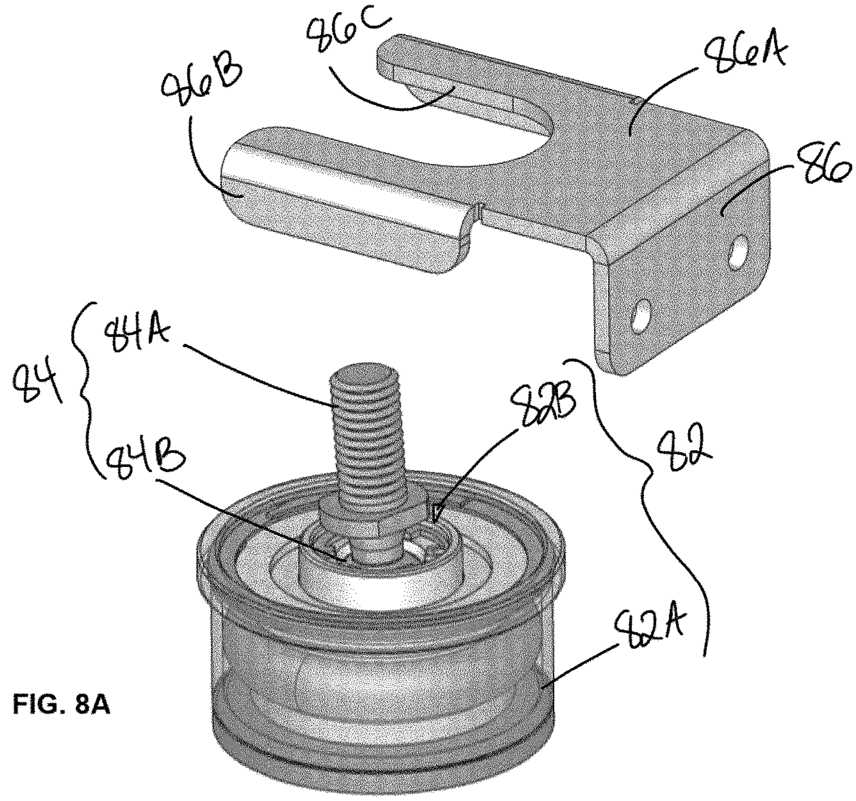
FIG. 8A is an exploded view of a first joint and of a bracket of the motion platform system of FIG. 7.

Turning to FIG. 8A, the particular, exemplary implementation of the first joint 80 of the present embodiment will be described in greater detail. The first joint 80 is connected to an end of the actuator system 10 (e.g., the movement interface 53) whereas an opposite, relatively displaceable end of the actuator system 10 (the support frame 51) is fixed to the motion structure 100. Hence, the first joint 80 imposes that motion of the movement interface 53 relative to the support structure 70 be limited to rotation about three axes. The first joint 80 may be a ball joint having a first support member 82 connected to the support structure 70, and a first output member 84 connected to the actuator system 10. The first joint 80 may be constrained relative to the support structure 70, whether fixedly, translatably or rotatably so, for example by way of a bracket 86. In some such implementations, one of the first support member 82 and the first output member 84 may be integral to the movement interface 53 which, for instance, may define a socket of the ball joint, or a ball of the ball joint. The first support member 82 is a base 82A defining a socket 82B, and the first output member 84 includes a stem 84A and a ball 84B joined thereto. It should be noted however that implementations of the first joint 80 in which the first support member 82 and the first output member 84 respectively define the ball and the socket of the ball joint are contemplated. On the outside, a bottom of the base 82A interfaces the support structure 70. On the inside, the base 82A defines a cavity surrounding components that define the socket 82B. Such socket-defining components may in some implementations be slidable relative to the base, at least to some degree, with the output side member 84 whose ball 84B is received therein. The first joint 80 may be provided with a boot attached to peripheral edges of the base 82A and of the stem 84A to follow relative movements thereof, shielding internal features of the first joint 80. In this embodiment, the bracket 86 is provided as one of various suitable means for holding the first joint 80 relative to the support structure 70, namely to restrain motion of the first support member 82. The bracket 86 may be fastenable to the support structure 70, for example via the groove 76B. A plate-like top portion 86A of the bracket 86 may be said to cover at least a portion of the first support member 82, via which the bracket 86 may limit or block movement of the first support member 82 relative to the support structure 70 in the Pz direction. In this implementation, the top portion 86A of the bracket 86 includes projections 86B extending on either side of the first support member 82 to hinder its movement in the Py direction. The top portion 86A may define an opening 86C through which the first output member 84 may extend. The opening may be sized so as to allow a suitable range of motion to the first output member 84 as it moves relative to the first support member 82 or even as it slides therewith relative to the bracket 86. In some implementations, some minimum translational movement of the first joint 80 may be possible to lessen stresses on the first joint 80.

Figure 8B:
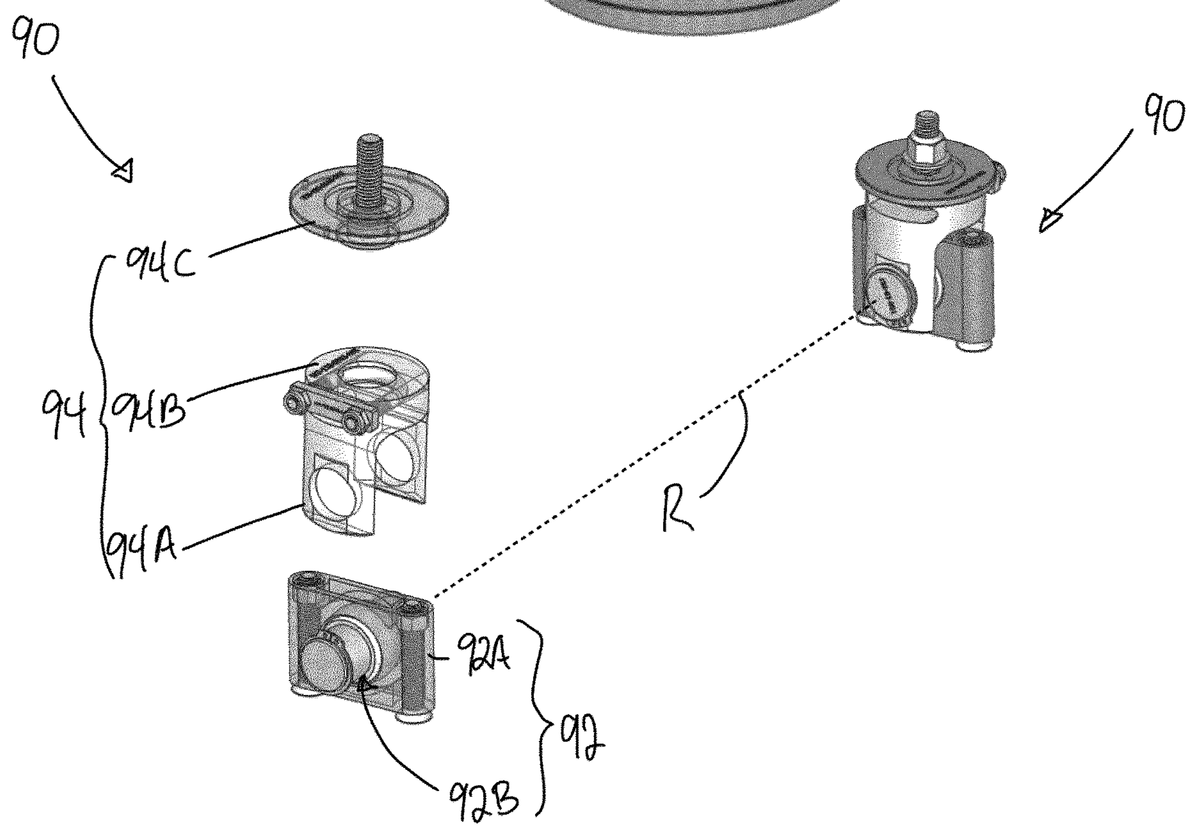
FIG. 8B is an exploded view of another joint of the motion platform system of FIG. 7, with portions being see-through and/or exploded.

Referring to FIG. 8B, it may be observed that the second joints 90 are pivots spaced from one another in a direction corresponding to that of the Py direction, though this is merely an option. The second joints 90 (one of which is exploded) each have a second support member 92 fixed to the support structure 70, and a second output member 94 fixed to the motion structure 100, namely its actuation portion 110. The second joints 90 may be similar in shape and in function, and may be disposed in line with one another in a hinge-like arrangement so as to define a common rotation axis R. The rotation axis R may be parallel to the Py direction. As the second joints 90 concurrently define a common rotation axis R, they constrain movement of the motion structure 100 relative to the support structure 70 in one rotational DOF. Therefore, although they are described as a pair of second joints 90, as they are discrete items, the second joints 90 may also be referred to as a single joint constraining movement to a single rotational DOF.

In the second joints 90, each second support member 92 may include a housing 92A with an inner diameter mounted to a pin-like shaft 92B, for example by way of a bearing. The bearing may be a spherical bearing, among other possibilities. Each second output member 94 may have a pair of prongs 94A merging together into a socle 94B, so as to define an inverted U shape therewith. A throughbore through the prongs 94A, may be sized to receive the shaft 92B. In this implementation, the housing 92A is pierced between the prongs 94A such that the inner diameter of the housing 92A aligns with an inner diameter of the bore, so that the shaft 92B may extend therethrough, supported by the housing and supporting the second output member 94 on either side of the housing 94A. In this implementation, the second output member 94 may be said to be mounted directly to the shaft 92B, as an outer diameter of the shaft 92B corresponds to the inner diameter of the bore. In other implementations, the second output member 94 may be mounted indirectly to the shaft 92B via one or more bearings fitted to the bore. The second output member 94 is mechanically joined to the motion structure 100, in this case via a connector 94C fastened to the socle 94B from across the actuation portion 110. The connector 94C may be a disk with a fastener, also described as a flanged bushing have a first, narrow end extending through an opening of the actuation portion 110 to be lodged into the socle 94B, and a second, wider end resting against the actuation portion 110. This means of joining the second joints 90 to the motion platform 100 may desirably distribute mechanical stress and mitigate loosening or wear of interfacing components, for instance by way of the disk increasing a contact surface between the second joint 90 and the motion platform 100. The second joint 90 as provided in certain other embodiments may differ functionally (e.g., provide additional degrees of freedom) and/or structurally. For instance, the second joints 90 may be provided in the form of a sole second joint such as a pivot, extending axially (i.e., in an orientation parallel to the rotation axis R) between opposite ends respectively disposed on opposite sides of the actuator system 10. The one or more second joints 90 may also be structured to allow other degrees of freedom in addition to rotation about the R axis, for example rotational movement about an axis that is orthogonal to the R axis, or even translational movement. For example, a pair of ball joints may be used. The second joints 90 may extend to either side of a notional plane in which the first joint 80 and the X direction of the actuator system 10 lay. Respective projections of the rotation axis R and of the X direction of the actuator system 10 in the plane of the Px and Py directions may be orthogonal.

The support members of the first and second joints 80, 90 are indirectly bound to one another so as to be held in a common position relative to a plane in which lay the Px and Py directions as the motion platform system 60 operates. Stated otherwise, the support members of the joints 80, 90 are fixedly connected to the support structure 70 at respective positions so as to maintain a common spatial relationship. The foregoing represents one non-limiting, exemplary spatial arrangement of the joints 80, 90 which may desirably distribute and balance loads imparted via the motion structure 100 to the joints 80, 90 and to the actuator system 10 as the motion platform system 60 operates.

The actuator system 10 is typically operated via a controller which may, for example as in the embodiment of FIG. 8, be provided as a part of the motion platform system 60. Generally shown at 10A, the controller 10A may be integrated with a power supply and packaged into a housing disposed proximate the actuator system 10. The controller 10A may even be sized and arranged so as to be shielded by other components of the motion platform system 60, for example by the bottom 72 of the support structure 70.

In the embodiment depicted in FIGS. 7-10, the actuator system 10 is mounted so as to extend lengthwise between the joints 80, 90, and oriented such that its movement interface 53 generally faces toward the support structure 70, namely its bottom 72. Conversely, in this orientation, the support frame 51 of the actuator system 10 generally faces away from the support structure 70 and toward the actuator-facing portion 110 of the motion structure 100. The movement interface 53 is operatingly connected to the support structure 70 via the first joint 80, and the support frame 51 is secured to the motion structure 100 via the actuator-facing portion 110. Consequently, actuation of the actuator system 10 causes a relative movement between the support structure 70 and the motion structure 100.

The support structure 70 and the motion structure 100 may be similarly sized such that, in use, the motion structure 100 generally remains above the support structure 70. A portion of the motion structure 100 may even overlay the controller 10A opposite the support structure 70. Moreover, a footprint of the motion platform system 60 may be shaped so as to correspond to that of a chair to be used therewith. In the present embodiment, the footprint (i.e., the contour of the motion structure 100, but also of the support structure 70) is pentagonal in shape and sized to match a footprint of a five-prong chair base. Other shapes are possible, such as circular, square, etc, whether or not as a function of the number of legs. In other implementations, either one or both of the support structure 70 and the motion structure 100 may be a web-like arrangement of interconnected members suitably arranged for connecting to the joints 80, 90 and to the actuator system 10 in a manner consistent with the foregoing. The motion structure 100 may in certain cases overhang from the support structure 70 and above the ground (and the support structure 70 could be the ground as well). The motion structure 100 may be constructed of sheet metal having been cut and shaped into a plate-like structure. In embodiments, the actuation portion 110 and the output portion 120 are distinct, plate-like structures together forming the motion structure 100. The actuation portion 110 (or first plate 110), has a generally flat bottom 112 surrounded with a peripheral edge wall 114. Tabs 114A may project from the peripheral edge wall 114. The sleeve 140 may be affixed to the motion structure 100 via such tabs 114A and, similarly, to the support structure 70 for example via the tabs 74A. Openings 116A and cutouts 116B may be formed in the first plate 110. For example, the second output members of the second joint 90 and the support frame 51 of the actuator system 10 may be fastenable to the motion structure 100 via such openings 116A. The cutouts 116B, on the other hand, may provide clearance between the motion structure 100 and other nearby components. The actuator system 10 may be fitted to one such cutout 116B such that a distance between the motion structure 100 and the support structure 70 may be less than a height of the actuator system 10 measured along its direction Y. The output portion 120 (or second plate 120) of the motion structure 100 also has a generally flat bottom 122 surrounded with tabs 124A projecting from a peripheral edge 124. In the depicted embodiment, the tabs 114A and 124A are complementarily staggered, with the tabs 124A overlapping the walls 114. Landforms 126 (e.g., cutouts such as slits 126A, troughs 126B, holes 126C, or even embossing) of various shapes and sizes may be formed in the second plate 120, some or all of which may be part of the docking features 130 of the motion structure 100. Casters of a chair may be received directly in the troughs, with an axis of rotation of the casters being parallel to lateral edges 128B projecting from an edge 128A of the cutouts 126B. Such straight cutouts may receive wheels or casters of different diameters, in such a way.

Figure 9:
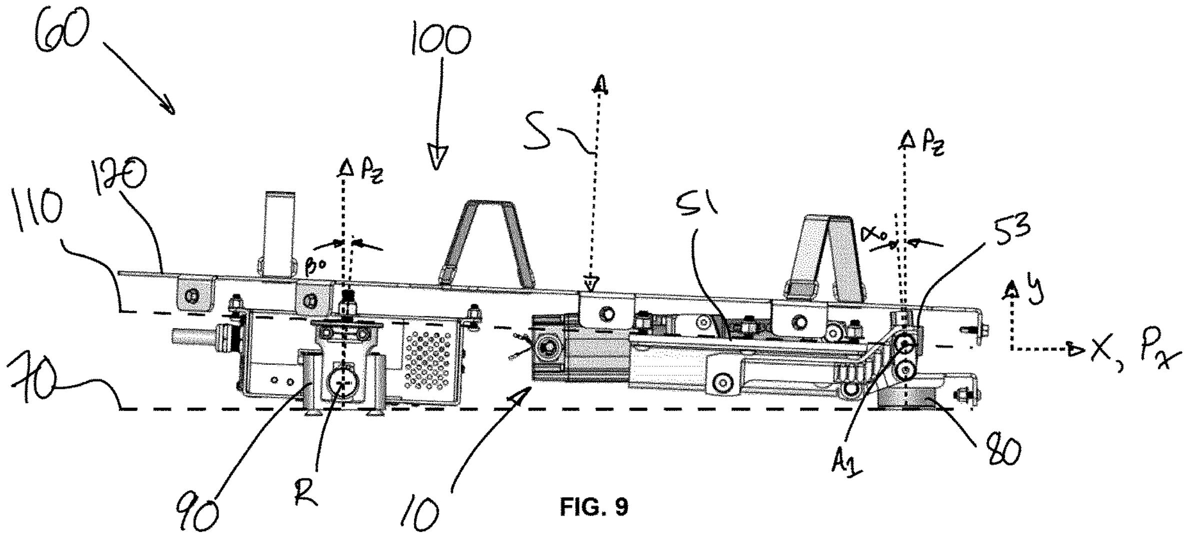
FIG. 9 is an elevation view of portions of the motion platform system of FIG. 7.
Figure 10:
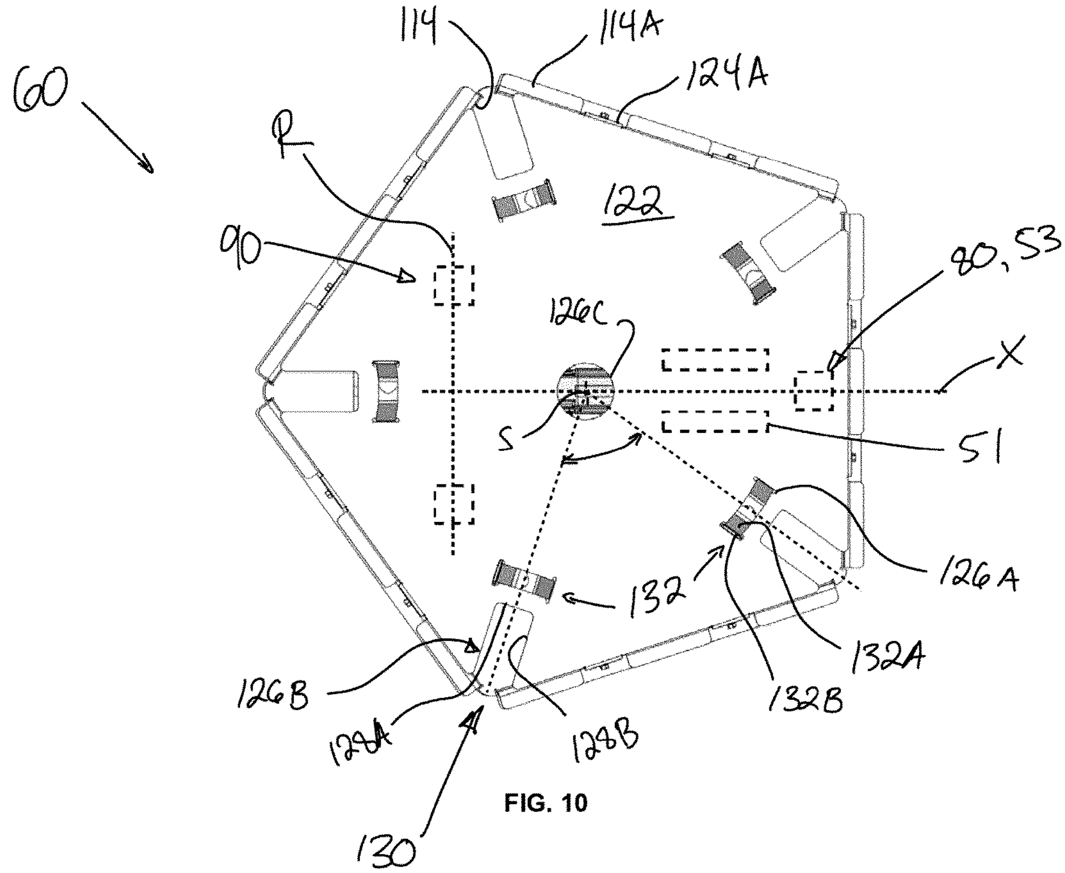
FIG. 10 is a top view of the motion platform system of FIG. 7.

Referring to FIGS. 9 and 10, characteristics pertaining to relative positioning of components of the motion platform system 60 will be detailed. In FIG. 9, a lowermost position of a motion range of the motion platform system 60 is shown, corresponding to a lowermost position attainable by any portion of the motion structure 110. The lowermost position may also be described as the position in which a distance taken along the Pz direction from the motion structure 100 to the bottom 72 of the support structure 70 is minimized. In the present embodiment, the lowermost position is attained upon the bottom 122 of the second plate 120 abutting against a portion of the movement interface 53 opposite that connected to the first joint 80. In contemplated variations, the motion platform 100 may be shaped such that its motion is absent hindrance by any singular contact that may otherwise occur throughout the motion range. In the lowermost position, the motion structure 100 is not parallel to the support structure 70, as the distance between the support structure 70 and the motion structure 100 at the second joints 90 is greater than at the first joint 80. Hence, in this position, the first output member 84 of the first joint 80 may be pivoted relative to its corresponding support member 82, with the movement interface 53, by a first initial angle $\alpha o$ about the axis A1. The first initial angle $\alpha o$ may for example be counter-clockwise when observed in the plane of FIG. 9. Still in the lowermost position, the second output members 94 of the second joints 90 may be pivoted relative to their corresponding support members 92, with the motion structure 100, by a second initial angle βo about the rotation axis R. The second initial angle βo may for example be clockwise when observed in the plane of FIG. 9. Likewise, a seating axis S corresponding to a vertical orientation of a seat connected to the motion platform system 60, may thus be pivoted with the motion structure 100 at the angle βo. As will become apparent from the forthcoming, the location of the seating axis S with respect to the motion structure 100 is generally determined by the docking features 130. Also, the location of the joints 80, 90, their respective initial angles αo, βo and various dimensional and structural considerations of the motion platform system 60 may be determined as a function of spatial and loading characteristics of the seat, which may differ based on the type of the seat being used, on user build and weight, and even on user preferences. In the depicted embodiment, it shall be noted that the first and second joints 80, 90 are disposed on either side of the seating axis S with respect to the direction Px, with the rotation axis R being closer than the axis A1 of the actuator system 10 with respect to the seating axis S—however other arrangements are possible. The above configuration may assist in effectively transmitting loads between the seat and the actuator system 10, for instance by rendering the output of the actuator system 10 as felt by a user via the seat appear vertical (or aligned with the seating axis S), and/or by compensating for an offset of a center of gravity of the user and the seat, typically forward (i.e., transversely away from the seating axis in the Px direction) due to users leaning toward a front of the seat toward display devices, input devices or the like.

As indicated hereinabove, the docking features 130 provide one or more attachment points for seating to be securely connected to the motion platform system 60. In FIG. 10, an exemplary implementation of the docking features 130 particularly suited for securing a telescopic chair will now be described in greater detail. The docking features 130 may include a plurality of groups of docking features 130A that may be distributed on the output portion 120 of the motion structure 100, for example along its periphery and/or near or at a center of the second plate 120. The groups of docking features 130 may be disposed in circumferential and/or radial positions relative to the seating axis S, in some cases evenly so, forming a pattern. In this embodiment, the docking features 130 includes seating fasteners 132 angularly spaced from one another relative to the seating axis S. A total of five seating fasteners 132 are disposed 72 degrees from one another, and respectively spaced radially inwardly from the periphery of the motion structure 100 relative to the seating axis S, a five-prong configuration reflecting that commonly found in chairs supported by five-prong wheeled bases. Some chairs may have three prongs, four prongs, etc, and the motion structure 100 may be adapted for such chairs as well. The seating fasteners 132 are in this case straps 132A attached to the motion structure 100 via the slit-like cutouts 126A defined in the second plate 120, adjustable in size via a buckle 132B (alternatives being Velcro®, snap connectors, elastics (e.g., bungees), etc). This implementation of the seating fasteners 132 is adapted to conform to various shapes of chair base prongs, which may differ from one another whether in length and/or in cross-sectional shape. In alternate implementations, seating fasteners 132 may allow to fasten a chair via its wheels, or even via sockets of the prongs via which the wheels pivotally connect. The docking features 130 of the present embodiment includes wheel fitting features, in this case disposed radially inwardly of the periphery of the motion structure 100 and radially outwardly of the seating fasteners 132. In this particular arrangement, each one of the wheel fitting features is in radial alignment with a corresponding one of the seating fasteners 132. The wheel fitting features may be concave troughs, and may be said to be conformable to various size wheels and various radial arrangements thereof. Indeed, the wheel-fitting features have radially elongated contours, which may correspond, at least in part, to that of the suitably dimensioned through-like cutouts 126B formed in the second plate 120. In the present implementation, each one of the wheel-fitting features extends radially outwardly relative to the seating axis S from the innermost edge 128A being an edge of a corresponding cutout 126B to an outermost edge corresponding to the wall 114 of the actuation portion 110 of the motion structure 100, the through-like cutouts 126B being outwardly open-ended, e.g. flaring outwardly. The lateral edges 128B of each wheel-fitting feature, also being edges of the corresponding cutout 126B portions, extend lengthwise alongside one another between corresponding innermost and outermost edges 128A, a space therebetween defining a width of the wheel-defining feature. Depending on their size and shape, wheels may be positioned differently to be received by a suitably aligned wheel-defining feature. For example, a wheel narrower than the width of the wheel-defining feature may be received such that it extends into the cutout 126B with its sides extending generally radially relative to the seating axis S and respectively facing a corresponding one of the lateral edges 128B. It shall be noted that the lateral edges 128B offer tread-contacting, circumferentially-spaced supports for a virtually unlimited range of wheel diameters upon such wheels being suitably positioned with their sides in a radial orientation relative to the seating axis S. The shape of the lateral edges 128B and the width of the wheel-fitting features may nevertheless be adapted to provide optimal support for a pre-determined range of wheel diameters. The wheel-fitting features may also be layered with materials, for example along one or more of their edges 128A, 128B, which may desirably assist wheel retention and/or mitigate wheel wear under normal use conditions. As another possibility, wheel-fitting features of various sizes may be offered, and selected as a function of wheel sizes. The docking features 130 also includes a stem-fitting feature, here provided in the form of the cutout 126C, in this case circular in shape, defined in the second plate 120 and surrounding the seating axis S. This stem-fitting feature may be sized for receiving a bottom end of a telescopic stem of a chair which, under certain circumstances, may otherwise collide with the motion structure 100. The docking features 130 may in some embodiments include features provided in different numbers, with different individual shapes, disposed in different patterns, and/or be added, removed or interchanged to customize support, clearance and even output transmission characteristics of the motion structure 100.

In some embodiments, the actuator, joints and docking features of the motion platform system 60 may differ from those described hereinabove, whether in terms of kinematics and/or of form factor.

Figure 11:
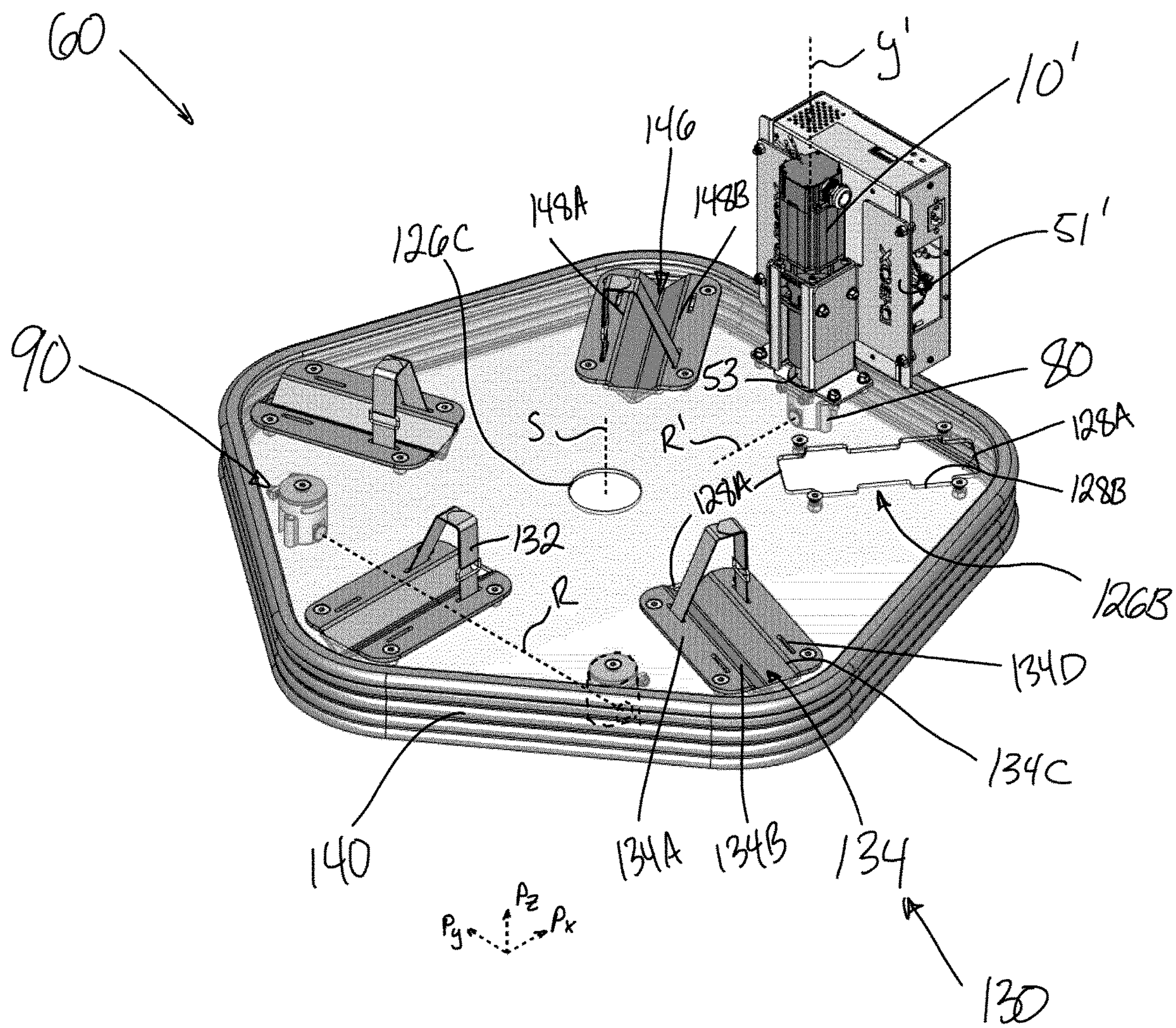
FIG. 11 is a perspective view of another motion platform system in accordance with another embodiment of the present disclosure.

Turning now to FIG. 11, one such embodiment of the motion platform system 60 provided with a vertically-oriented linear actuator system 10' is shown. The motion platform system 60 may have numerous similar components as the one of FIGS. 7-10 whereby like components will bear like reference numerals. The actuator system 10' includes a casing held by a support frame 51', a motor received in the casing, and a movement interface 53' connected to the joint 90 (although a joint 80 could be used). The motor is operatingly connected to the movement interface 53' such that it may be reciprocated along a translational direction Y' relative to the casing. The support frame 51' is mounted to the motion structure 100, in this case on top of the second plate 120, holding the casing such that the movement interface 53' faces toward the support structure 70. By this arrangement, the direction Y' is at an angle relative to the plane in which the directions Px, Py lay. The movement interface 53' may thus engage the support structure 70 via the joint 90 such that the motion structure 100 reciprocates pivotally about the axis R as the movement interface 53' reciprocates along the direction Y'. A rotational axis R' of the joint 90 at the movement interface 53' may be transverse to the rotational axis R of the other joints 90 in FIG. 11.

In embodiments, alternate implementations of the motion structure 100 may be provided. Still referring to FIG. 11, the docking features 130 include wheel-fitting features disposed in an even, circular pattern relative to the seating axis S. Outer cutouts 126B (characterized as outer relatively to the seating axis S and in contrast to inner cutouts 126C, when present) have a closed contour defined in the second plate 122 at a location spaced inwardly from the peripheral edge 124. The contour of each outer cutout 126B defines innermost and outermost edges 128A of the wheel-fitting features, and lateral edges 128B extending therebetween, in this case the latter also defining pockets. Such pockets may, depending on the implementation, form retentive features or clearance for other components being part of the docking features 130. Such components may be inserts 134 fitted to the outer cutouts 126B and attached to the motion structure 100 via one of various suitable means. For example, the inserts 134 may have a shape complementary to that of the outer cutouts 126B and structured so as to be mechanically retained by the second plate 120 upon being received by one of the outer cutouts 126B. In the present embodiment, each insert 134 defines flanges 134A overlaid onto the second plate 120, namely on either side of the corresponding outer cutout 126B, and held in place via fasteners. It should be noted that various means are contemplated for securing the inserts 134 to the motion structure 100, some of which may be permanent such as chemical adhesives and welding.

Each insert 134 may define a recessed surface 134B laterally flanked by the flanges 134A and shaped so as to extend inwardly into the motion platform 100 via one of the outer cutouts 126B upon its adjoining flanges 134A laying against the second plate 120. The recessed surface 134B may extend radially outwardly relative to the seating axis S as it extends away from the inner edge 128A. A cross-sectional profile of the recessed surface 134B may be V-shaped as shown, or shaped otherwise to conform to a wide variety of wheel shapes. Alternatively, recessed docking features can be created by slots (or recessed V-shape surfaces) directly at the surface of the motion platform output plane 120. For instance, five slot cutouts arranged at 72 degrees around center axis S could receive the five wheels of an office chair, the wheels being oriented perpendicular to the slots so that each wheel is immobilized by gravity and 2 contact points with the slot along the periphery of the wheel. Lateral edges 134C may be defined either by the flanges 134A, the recessed surface 134B or, as in the depicted implementation, may correspond to a bend in the insert 134 formed where the recessed surface 134B meets each of its adjoining flanges 134A. Each insert 134 may include one or more seating fasteners 132, here passing through slit-like openings 134D of the insert 134, defined in pairs opposite one another in the flanges 134A. The seating fasteners 132 may be used to strap a prong or wheel of a chair disposed thereon to the underlying insert 134, against the recessed surface 134B, to secure the chair to the motion structure 100. More than one pair of openings 134D may be provided lengthwise between the innermost and outermost edges 128A of any given wheel fitting feature, allowing to select which openings 134D to use for fastening a certain type of chair and/or to use more than one seating fastener 132 for a given prong or wheel of a chair. The openings 134D may line up with the pockets defined by underlying lateral edges 128B or, in other implementations, with other suitably sized and positioned slit-like openings defined in the second plate 120. In yet other implementations, the seating fasteners 132 are surface-mounted, meaning that they are secured to a remainder of the motion structure 100 without extending underneath any of the inserts 134 or the second plate 120.

In embodiments of the motion platform system 60, a plurality of actuators may be provided, suitably sized and joined relative to the motion structure 100 so as to impart desired degrees of freedom and ranges of motion thereto. In some such embodiments, a secondary actuator may be arranged to effect a secondary output targeting a portion of a chair secured to the motion structure 100, for example a portion of the seat, a portion of the base or a wheel, to impart motion thereto in a distinct, radially offset manner relative to the output of the actuator as described hereinabove.

The invention claimed is:

1. A linear actuator system comprising:

an actuator assembly for moving an output in translation in a first direction; and a transmission having a frame, a joining link pivotally connected to the frame at a first location and operatively connected to the actuator assembly at a second location for receiving movement from the output, the joining link contacting an interface at a third location to cause relative movement between the frame and the interface in a second direction differing from the first direction.

2. The linear actuator system according to claim 1, wherein the first direction and the second direction are generally transverse to one another.

3. The linear actuator system according to claim 1, wherein the joining link has the first location, the second location and the third location in a L pattern.

4. The linear actuator system according to claim 3, wherein the joining link has a triangular shape.

5. The linear actuator system according to claim 1, including a pair of the joining links, the pair sharing a first rotational axis at the first location and sharing a second rotational axis at the second location.

6. The linear actuator system according to claim 5, wherein the pair share a third rotational axis at the third location.

7. The linear actuator system according to claim 1, wherein the joining link is pivotally connected to the output of the actuator assembly at the second location.

8. The linear actuator system according to claim 7, wherein the joining link is pivotally connected to at least one link at the third location, the at least one link being pivotally connected to the interface.

9. The linear actuator system according to claim 8, wherein the interface is pivotally connected to the frame.

10. The linear actuator system according to claim 9, wherein the interface has a pair of arms projecting from a central member, the pair of arms being pivotally connected to the frame, the central member pivotally connected to the at least one link.

11. The linear actuator system according to claim 1, wherein the joining link is pivotally connected to at least a first link at the second location, the first link being pivotally connected to the output of the actuator assembly.

12. The linear actuator system according to claim 11, wherein the joining link is pivotally connected to at least one second link at the third location, the second link being pivotally connected to the interface.

13. The linear actuator system according to claim 12, wherein the interface is pivotally connected to the frame, and the actuator assembly is secured to the frame.

14. The linear actuator system according to claim 13, wherein the interface has a pair of arms projecting from a central member, the pair of arms being pivotally connected to the frame, the central member pivotally connected to the second link.

15. The linear actuator system according to claim 1, wherein the frame defines a receptacle to receive at least a portion of the actuator assembly.

16. The linear actuator system according to claim 1, wherein the actuator assembly is a bi-directional linear actuator.

17. A motion platform system comprising:

a support structure;

a motion structure operatively mounted to the support structure by at least one joint so as to be displaceable relative to the support structure in at least one degree of freedom; and at least one of the linear actuator system of claim 1, the linear actuator system being between the support structure and the motion structure, the linear actuator system actuatable to impart movement to the motion structure in the at least one degree of freedom.

18. The motion platform system according to claim 17, wherein the motion structure includes a first panel configured to define a motion platform.

19. The motion platform system according to claim 18, wherein the first panel has receptacles configured for receiving casters of a chair.

20. A linear actuator system comprising:

an actuator assembly for moving an output in translation in a first direction; and a transmission having a frame, a joining link pivotally connected to the frame at a first location and operatively and pivotally connected to the actuator assembly at a second location for receiving movement from the output, the joining link pivotally connected to an interface at a third location to cause relative movement between the frame and the interface in a second direction generally transverse to the first direction, wherein rotational axes pass through the joining link at the first location, the second location and the third location, the rotational axes being at a fixed distance relative to one another on the joining link.

* * * * *